United States Patent
Lee

(10) Patent No.: US 7,933,278 B2
(45) Date of Patent: Apr. 26, 2011

(54) APPARATUS AND METHOD FOR PROVIDING NETWORK INFORMATION

(75) Inventor: Jin-hyoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 11/828,781

(22) Filed: Jul. 26, 2007

(65) Prior Publication Data

US 2008/0101384 A1    May 1, 2008

(30) Foreign Application Priority Data

Oct. 27, 2006  (KR) .................. 10-2006-105333

(51) Int. Cl.
*H04L 12/56* (2006.01)
(52) U.S. Cl. ......... 370/400; 370/254; 370/349; 370/469
(58) Field of Classification Search .......... 370/390, 370/389, 349; 455/433
See application file for complete search history.

(56) References Cited

U.S. PATENT DOCUMENTS

| | | | | |
|---|---|---|---|---|
| 5,235,597 | A * | 8/1993 | Himwich et al. | 370/469 |
| 7,342,896 | B2 * | 3/2008 | Ayyagari | 370/254 |
| 7,701,858 | B2 * | 4/2010 | Werb et al. | 370/241 |
| 2003/0045287 | A1 * | 3/2003 | Taniguchi | 455/433 |
| 2003/0198214 | A1 * | 10/2003 | Tsukakoshi et al. | 370/351 |
| 2004/0052238 | A1 * | 3/2004 | Borella et al. | 370/349 |
| 2006/0274750 | A1 * | 12/2006 | Babbar et al. | 370/390 |
| 2007/0147334 | A1 * | 6/2007 | Guthrie | 370/349 |

FOREIGN PATENT DOCUMENTS

| | | |
|---|---|---|
| CN | 1689348 | 10/2005 |
| JP | 09-298550 | 11/1997 |
| JP | 2005-252606 | 9/2005 |
| KR | 2002-90467 | 12/2002 |
| KR | 2004-53850 | 6/2004 |
| KR | 2006-18882 | 3/2006 |
| KR | 2006-25286 | 3/2006 |
| KR | 2006-31616 | 4/2006 |
| KR | 2006-56899 | 5/2006 |
| KR | 2006-78418 | 7/2006 |
| WO | WO 2004/109536 | 12/2004 |
| WO | WO 2004/114690 | 12/2004 |

OTHER PUBLICATIONS

Office Action issued Jul. 23, 2007 by the Korean Intellectual Property Office re: Korean Patent Application No. 2006-105333 (3 pp).

(Continued)

*Primary Examiner* — Dang T Ton
*Assistant Examiner* — Pamit Kaur
(74) *Attorney, Agent, or Firm* — NSIP Law

(57) ABSTRACT

A network-information-providing device including a control unit that extracts an object node whose network connection state is most stable by referring to network information of one or more nodes that comprise a network when receiving a network-connection request, and a communication unit that transmits address information of the object node. The network-information-providing device efficiently determines the network states of each of the nodes connected to the network and provides the most stable node as that object node, to which the new node connects.

32 Claims, 7 Drawing Sheets

OTHER PUBLICATIONS

Notice of Allowance issued in corresponding Korean Patent Application No. 2006-0105333 dated Sep. 23, 2007.
Reference AK (WO 2004/109536) is substantially equivalent to Reference AH (KR 2006-18882) and Reference AI (KR 2006-31616).
Reference AL (WO 2004/114690) is substantially equivalent to Reference AJ (KR 2006-56899).
Chinese Office Action issued on Feb. 12, 2010, in corresponding Chinese Application No. 200710167549.X (2 pages).

* cited by examiner

FIG. 6

| NODE 615 | ADDRESS INFORMATION 620 | MEMORY SIZE 625 | MAXIMUM NUMBER OF CONNECTABLE NODES 630 | NUMBER OF CURRENTLY-CONNECTED NODES 635 | FIRST WEIGHT 640 | DURATION AFTER CONNECTION TO NETWORK 645 | SECOND WEIGHT 650 | THIRD WEIGHT 655 | NETWORK-INFORMATION-UPDATE TIME 660 |
|---|---|---|---|---|---|---|---|---|---|
| 1 | 192.128.x.x | 128 MB | 5 | 4 | 1.1 | 300s | 0.8 | 0.5 | 2006.10.27 11:25:30 |
| 2 | 192.128.x.x | 128 MB | 5 | 2 | 0.5 | 210s | 0.9 | 1.2 | 2006.10.27 10:42:45 |
| 3 | 192.128.x.x | 32 MB | 6 | 6 | 2.1 | 570s | 2.8 | 2.5 | 2006.10.27 11:26:09 |
| 4 | 192.128.x.x | 64 MB | 4 | 3 | 1.4 | 409s | 0.8 | 0.8 | 2006.10.27 11:12:02 |

600

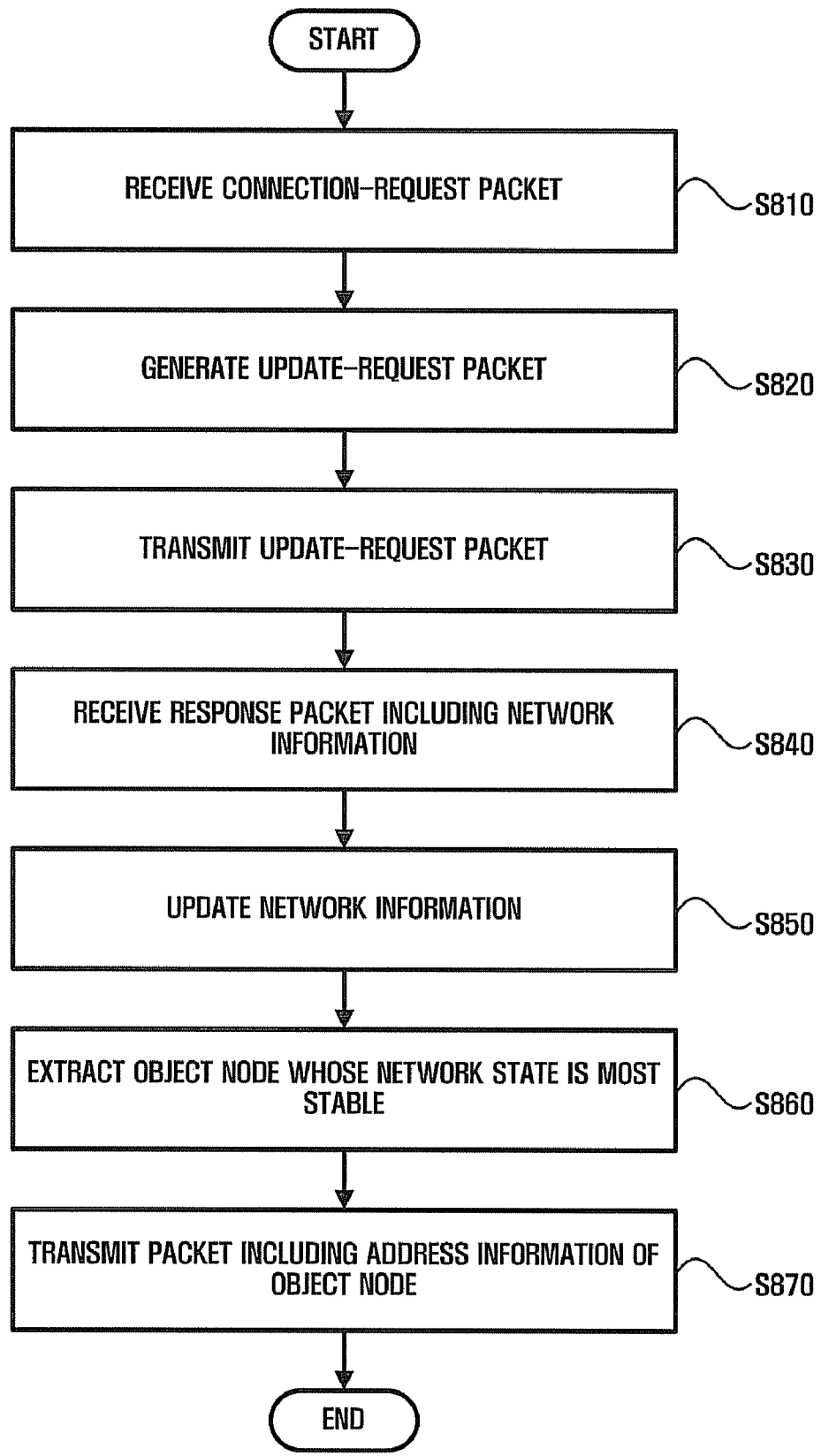

APPARATUS AND METHOD FOR PROVIDING NETWORK INFORMATION

CROSS-REFERENCE TO RELATED APPLICATIONS

This application claims the benefit of Korean Patent Application No. 2006-105333, filed Oct. 27, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to an apparatus and method for providing network information. More particularly, aspects of the present invention relate to an apparatus and method for providing network information, which determine the network state of nodes existing in a network and provide the state information to a new node when the new node connects to the distributed network.

2. Description of the Related Art

Along with the introduction of wireless networks such as a mobile phone network, wireless LANs, WiBro, WiFi, and Bluetooth networks, services using peer-to-peer communication between mobile devices (hereinafter, called "nodes") have become widespread. That is, nodes exist in a network and communicate with each other to share information, namely transmit and receive data.

In the case where a new node tries to connect to a network in such a distributed network environment, the new node may not be able to easily establish a network connection depending upon the network state of the nodes already existing in the network.

FIG. 1 illustrates the conventional distributed wireless network, and shows the case where a new node 10 is connected to a pre-existing network. In the case where the new node 10 tries to connect to a network consisting of a plurality of nodes, the new node 10 tries to enter the network using network information 15 of another node, which the new node 10 has. For example, in the case where the new node 10 has network information 15 of node 1 11 and node 2 12, the new node 10 first tries to connect to node 1 11, and, if the try fails, it tries to connect to node 2 12.

However, as illustrated in FIG. 1, because node 1 11 is connected to the other nodes, when the new node 10 is connected to node 1, it is possible that node 1 11 is unable to appropriately operate because of the lack of memory resources or network resources. Further, at the moment when the new node 10 tries to connect to node 2 12, if node 2 12 leaves the network, the network connection of the new node 10 fails.

Hence, it is preferable for the new node 10 to try to connect to a node whose network state is good; for example, a node to which only a few other nodes are connected, or a node that is expected to maintain the connection to the network. For this, the methods described below can be used.

First, the new node 10 tries to connect to node 1 11 and node 2 12 at the same time. Here, the method of connecting to a plurality of nodes at the same time can form a loop with the connected nodes; however, in such case overhead can be created and can decrease efficient use of system resources of the nodes connected to the loop. Second, nodes existing in the network periodically transmit and receive their network states. As such, the method of periodically transmitting and receiving the network state between nodes can increase the load on the network. Third, a separate device collects the network state of nodes and provides the collected information to the new node 10. However, there should be a separate device, and because the band for the whole network needs to be used for collecting the network state of the nodes, the network can become overloaded.

Hence, there is a need for a method in which a new node 10 can try to and connect to valid nodes without a separate device, minimizing the increase of the network load.

SUMMARY OF THE INVENTION

Aspects of the present invention allow for the collection of the network states of nodes existing in a network and provide the collected information to a new node in the case where the new node exists in the distributed network.

Aspects of the present invention track a user's pattern by nodes existing in the pre-existing network, and provide the information thereof to a new node.

Aspects of the present invention will not be limited to the technical objects described above. Aspects not described herein will be more definitely understood by those in the art from the following detailed description.

According to aspects of the present invention, there is provided a network-information-providing device including a control unit that extracts an object node whose network connection state is most stable by referring to network information on one or more nodes that comprise a network when receiving a connection request to the network, and a communication unit that transmits address information of the object node.

According to aspects of the present invention, there is provided a network-information-providing method including receiving a network-connection-request packet, transmitting an update-request packet for requesting the update of the network information on one or more nodes that comprise the network when receiving the connection-request packet, receiving the network information in response to the update-request packet, extracting the object node whose network-connection state is most stable by referring to the received network information, and transmitting the address information of the object node.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a table illustrating network information according to aspects of the present invention;

FIG. 8 is a flowchart illustrating the process where network information is provided according to aspects of the present invention.

DETAILED DESCRIPTION OF THE EMBODIMENTS

Figure 1:
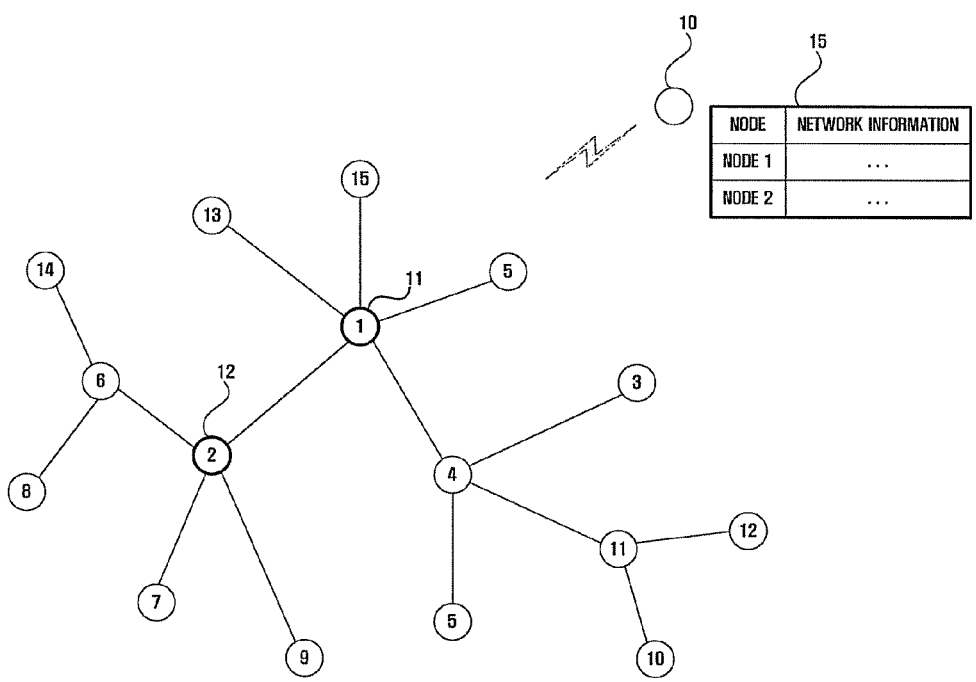
FIG. 1 illustrates the conventional distributed wireless network.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
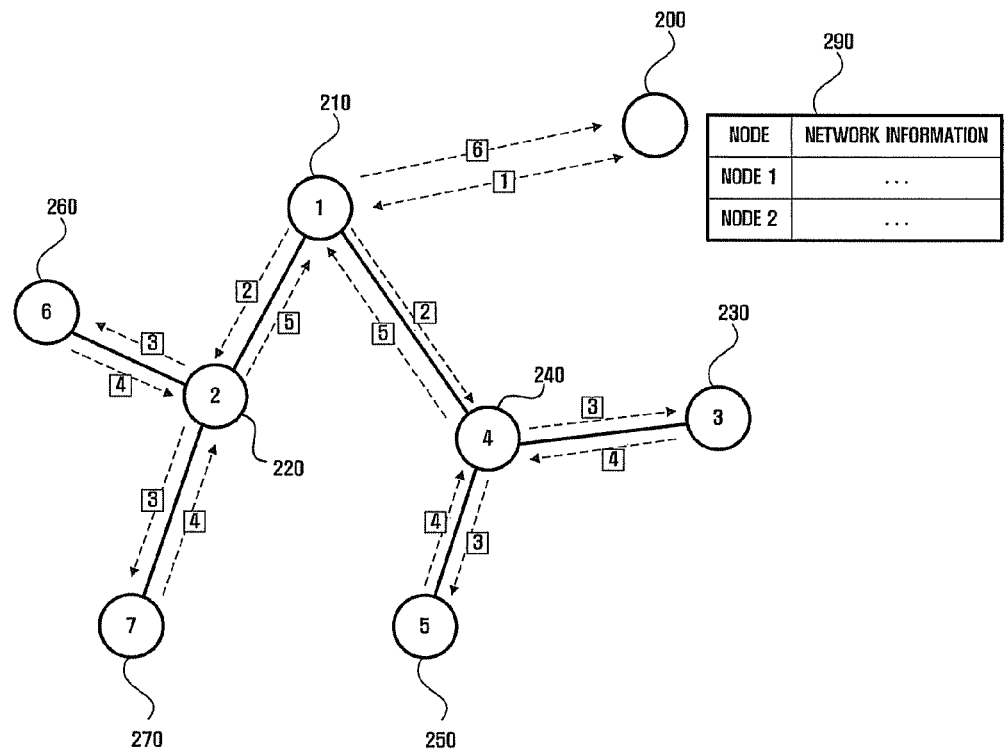
FIG. 2 illustrates a distributed wireless network according to aspects of the present invention.

FIG. 2 illustrates a distributed wireless network according to aspects of the present invention, and the situation where a new node 200 connects to the existing network. The new node 200 can have network information for one or more other nodes, and attempts to connect to the network using such information. It is assumed that the new node 200 of FIG. 2 includes network information of node 1 210. Here, the network information 290 includes at least one of the following categories of network information: address information of a node, maximum number of connectable nodes, duration after connection to the network, or updated time of the network information, and is used to check the network states of the nodes. The network information 290 will be described later in detail with reference to FIG. 6.

As the new node 200 attempts to connect to the node 1 210, the node 1 210 transmits a response packet to the new node 200, and a session is initiated between the new node 200 and the node 1 210. After the session with the new node 200 is initiated, node 1 210 transmits a packet requesting the update of network information (hereinafter, called an "update-request packet") to a node 2 220 and a node 4 240, which are both connected to the node 1 210. That is, by transmitting the update-request packet including network information of the node 1 210, the node 1 210 allows the node 2 220 and the node 4 240 to update the network information that has been stored in advance by applying the network information received from the node 1 210.

As such, the node 2 220, which has received the update-request packet from the node 1 210, applies the network information of the node 1 210 included in the received update-request packet to the network information stored in the node 2 220 itself for the update, and transmits the update-request packet to the node 6 260 and the node 7 270, which are both connected to the node 2 220.

Further, the node 4 240 applies the network information of the node 1 210 included in the received update-request packet to the network information previously stored in the node 4 240, and transmits the update-request packet to the node 3 230 and the node 5 250 that is connected to the node 4 240.

Here, the update-request packet that is transmitted by the node 2 220 and the node 4 240 refers to the update-request packet that includes the network information updated by the node 2 220 and the node 4 240. As such, each node updates the network information previously stored on that node with the information received from the nodes from which each node receives the update-request packet.

Figure 3:
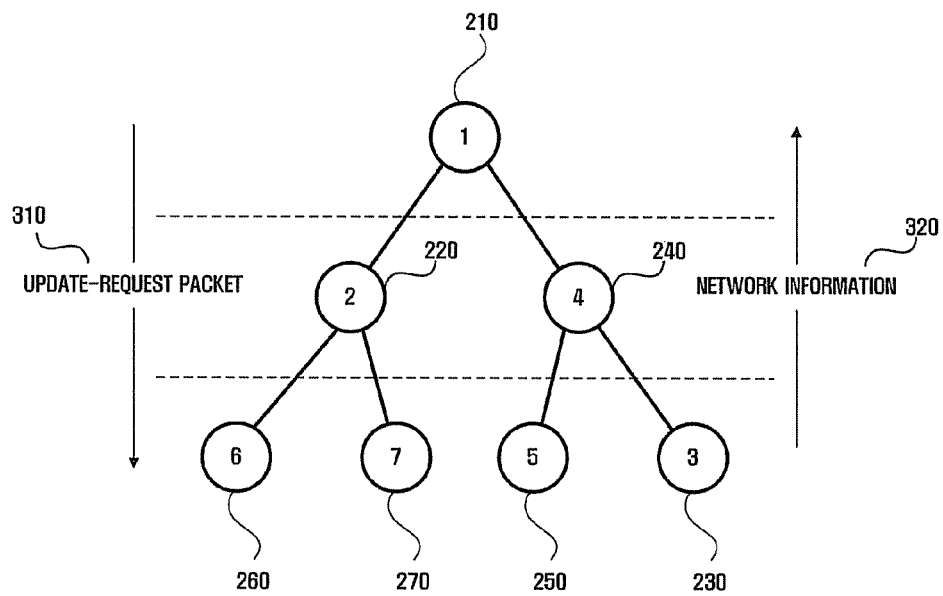
FIG. 3 illustrates a hierarchical structure of nodes that comprise the distributed wireless network of FIG. 2.

It is assumed that the nodes that comprise the network are connected in a tree structure. FIG. 3 illustrates connection of the nodes 210 to 270, which comprise the distributed wireless network of FIG. 2, in a hierarchical structure. That is, the node 1 210, which receives the network-connection request from the new node 200, is positioned in the uppermost or first layer, the node 2 220 and the node 4 240, which are connected to the node 1 210, are positioned in the next or second layer, and the node 3 230, the node 5 250, the node 6 260, and the node 7 270, which are respectively connected to the node 2 220 and the node 4 240, are positioned in the next or third layer. The network is not limited to the three layers herein described. Further, the network need not be connected in a tree structure as levels of layers may be determined in networks configured having topologies such as a line, a mesh, a ring, a star, a bus, or a fully connected topology. However, when topologies are used containing multiply-connected nodes, or nodes that would be directly connected to a node in each of two layers, an added operation to identify nodes for which network information has already been updated would be necessary.

As illustrated in FIG. 3, the update-request packet 310 is transmitted from the first layer to the third layer; and the network information 320, the response to the request, is transmitted from the third layer to the first layer. The nodes of each layer send a request to update the network information (the update-request packet) to the nodes of the layer below which the nodes of each layer are organized, and wait until the network information is received from such nodes of the layer. For example, the node 2 220 on the second layer transmits the update-request packet to the node 6 260 and the node 7 270; and in return, the node 6 260 and the node 7 270 transmit updated network information to the node 2 220. In such case and as the update request packet includes information from the layers above the third layer, the node 6 260 and the node 7 270 have the most up-to-date information regarding the statuses of the node 2 220 and the node 1 210. More generally, the nodes on the lower layers receive updated information regarding the nodes on the layers above up to the node to which the new node is attempting to connect.

The node that has received network information updated from the nodes of all lower layers connected to it transmits the received network information to the node of the upper layer. Further, because the node 3 230, the node 5 250, the node 6 260, and the node 7 270 existing in the third layer are connected to only the node 2 220 or the node 4 240 of the second layer, the nodes of the third layer do not perform the request of updating the network information, and only the network information updated by the nodes of the third layer is transmitted to the nodes of the second layer. However, in a network comprising more layers, the nodes of the third layer would continue the process as if the nodes were on the second layer such that the nodes on the third layer would update and transmit and update-request packet to nodes of a fourth layer. Such process would continue to an nth layer, at which point the nth layer would not transmit an update-request packet to nodes of a lower layer but only transmit updated network information to nodes on an (n-1)th layer.

Here, the node that has transmitted the update-request packet to the nodes of the lower layer can disregard the network information in the case where the node does not receive updated network information from the node of the lower layer within a predetermined critical time. For example, after the node 2 220 transmits the update-request packet to the node 6 260 and the node 7 270, in the case where the network information is received from the node 6 260 within the critical time, but the network information is not received from the node 7 270 within the critical time, the node 2 220 disregards the network information of the node 7 270, and transmits only the network information received from the node 6 260 to the node 1 210.

Referring to FIG. 2, the node 1 210, which received the network information from the node 2 220 and the node 4 240, combines the network information, and generates one set of updated network information.

Further, the node 1 210 extracts one node having the most stable network state by referring to the updated network information, and transmits address information of the extracted node to the new node 200. However, the node 1 210 may extract several nodes having the most acceptable network states such that the node 1 210 would transmit the address information of the nodes having the first, second, and third most stable network states.

As such, the new node 200 tries to connect to the extracted node (hereinafter called an "object node") for which the new node 200 has address information received from the node 1 210, and because the network state of the object node is expected to be stable, the new node 200 can easily connect to the network.

Figure 4:
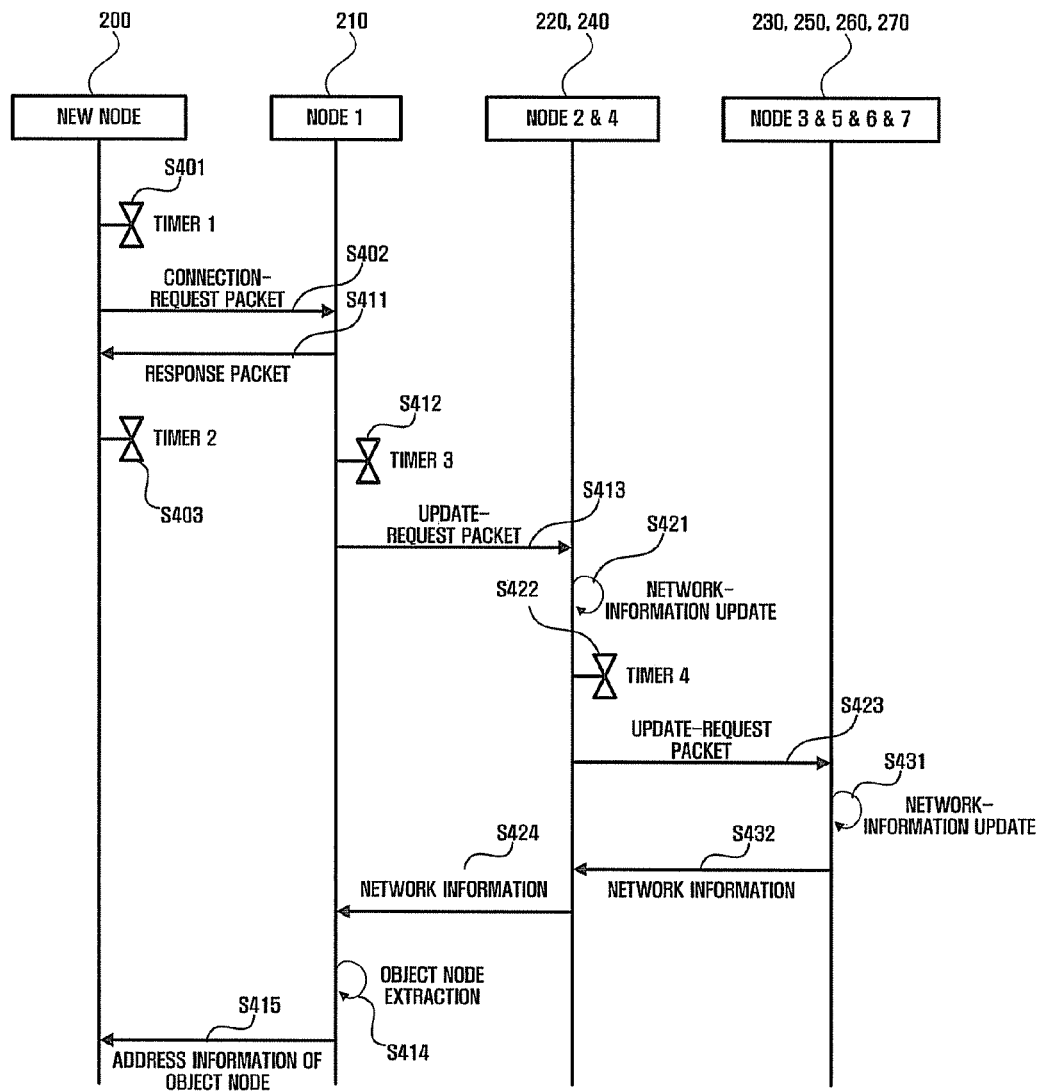
FIG. 4 is a flowchart illustrating the process where a new node connects to the network according to the embodiment of FIG. 2.

FIG. 4 is a flowchart illustrating a process in which a new node connects to a network according to the embodiment of FIG. 2. First, the new node 200 transmits a packet that requests network connection (hereinafter called a "connection-request packet") to the node 1 210 corresponding to the network information (S402), and the node 1 210 transmits the response packet to the new node 200 S411, by which a session between the new node 200 and the node 1 210 is initiated. The new node 200 is described as transmitting the connection-request packet to the node 1 210, but the new node 200 may transmit the connection-request packet to any one of the other nodes in the network for which the new node 200 has network information. Further, the new node 200 may also transmit connection-request packets to several of the nodes in the network for which the new node 200 has network information.

When transmitting the connection-request packet, the new node 200 executes a timer 1 (S401), and in the case where the response packet is not received from the node 1 210 within a critical time as measured by the timer 1, the connection to the network is tried using network information of other nodes.

Further, the new node 200, upon receipt of the response packet from the node 1 210 within the critical time as measured by the timer 1 (S411), terminates the timer 1, and executes a timer 2 (S403). The timer 2 is used to determine a critical time within which address information regarding the object node from node 1 210 should be received, and it is preferable that the critical time of the timer 2 be sufficient for the transmitted packet to circulate throughout the network.

The node 1 210, which has initiated a session with the new node 200, executes a timer 3 (S412), and transmits the update-request packet to the node 2 220 and the node 4 240 (S413). Here, the timer 3 is used to determine a critical time within which the network information from the node 2 220 and the node 4 240 should be received.

The node 2 220 and the node 4 240, both of which received the update-request packet from the node 1 210, update their network information using the network information of the node 1 210 included in the received update-request packet (S421).

Further, the node 2 220 and the node 4 240 execute a timer 4, respectively (S422), and transmit the update-request packet to the node 3 230, the node 5 250, the node 6 260, and the node 7 270 existing in the lower layer (S423). Here, the timer 4 is used to determine a critical time within which network information from the node 3 230, the node 5 250, the node 6 260, and the node 7 270 should be received.

Further, the update-request packet transmitted by the node 2 220 and the node 4 240 includes network information updated by the node 2 220 and the node 4 240, and the network information is updated using the node 3 230, the node 5 250, the node 6 260, and the node 7 270 (S431).

The node 3 230, the node 5 250, the node 6 260, and the node 7 270, which updated the network information, transmit the updated network information to the node 2 220 or the node 4 240 (S432). As the node 3 230, the node 5 250, the node 6 260, and the node 7 270 are in the lowest or third layer, the nodes do not transmit the update-request packet to any lower level nodes. However, the node 3 230, the node 5 250, the node 6 260, and the node 7 270 in the third layer may not be the lowest layer of the network, in which case the nodes would transmit the update-request packet to the lower layers using the above-described process.

As the updated network information is received, the node 2 220 and the node 4 240 transmit the received network information (S424). If the time taken to receive the updated network information after the transmission of the update-request packet exceeds the critical time as determined by the timer 4, network information of the node for which information was not received can be disregarded, and only the network information of the node that transmitted the updated network information to the node 1 210 within the critical time as determined by the timer 4. The node 2 220 and the node 4 240 refer to the timer 4 for determining whether the time has exceeded the critical time.

The node 1 210 receives the updated network information from the node 2 220 and the node 4 240, and if the time taken to receive the updated network information after the transmission of the update-request packet exceeds the critical time as determined by the timer 3, the network information of the node for which no information is received is disregarded. In such case, the new network information is generated using only the network information of the nodes that have not exceeded the critical times as determined by the timers 3 and 4. The node 1 210 can refer to the timer 3 for determining whether the time has exceeded the critical time.

The node 1 210, which has generated the new network information, extracts the object node by referring to the performance of each node included in the network information (S414). That is, the extraction is performed by referring to the maximum number of connectable nodes, the length of time each node has been connected to the network, and others (the extraction of the object node will be described in detail later with reference to FIG. 7).

Further, the address information of the object node is transmitted to a new node 200 (S415), and the new node 200 attempts to connect to the object node in the network using the received address information of the object node.

Figure 5:
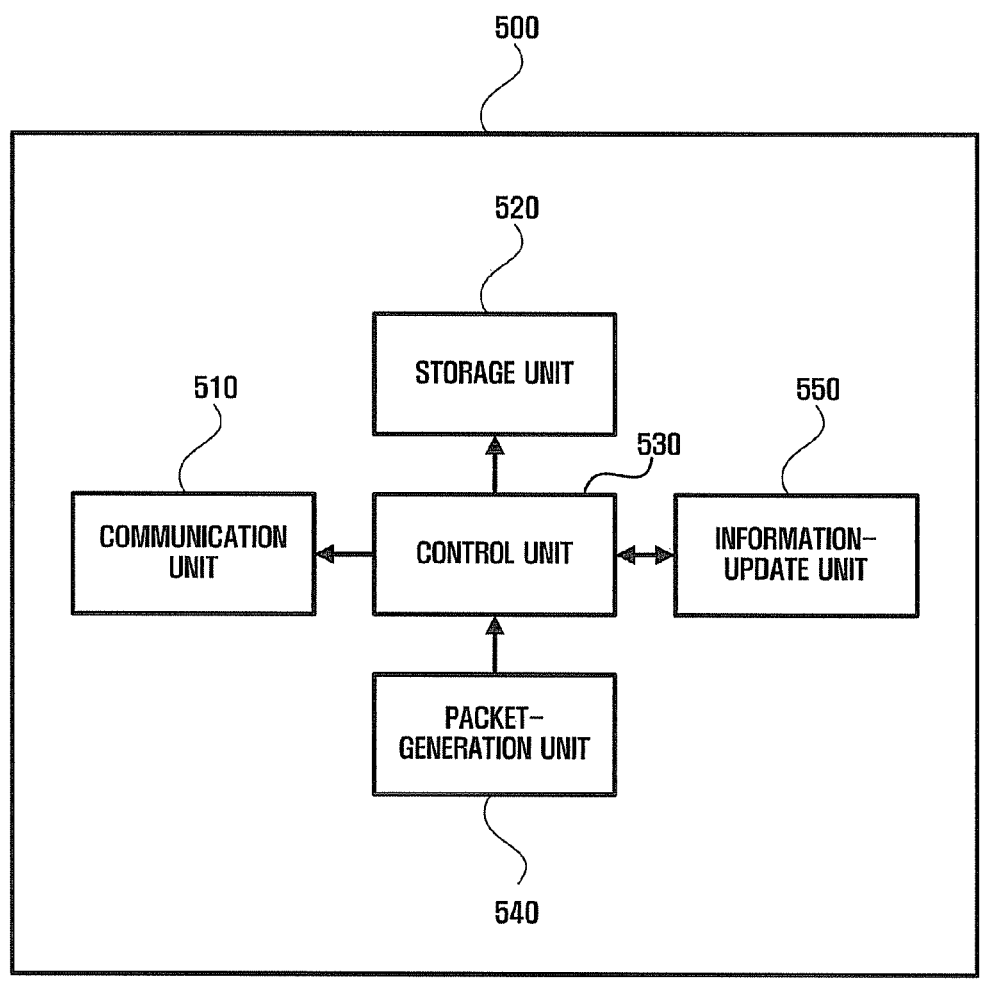
FIG. 5 is a block diagram illustrating a network-information-providing device according to aspects of the present invention.

FIG. 5 is a block diagram illustrating a network-information-providing device according to aspects of the present invention, and the network-information-providing device 500 includes a communication unit 510, a storage unit 520, a control unit 530, a packet-generation unit 540, and an information-update unit 550.

The storage unit 520 stores network information. Here, the network information stored in the storage unit 520 determines the network state of the network-information-providing device 500 and can include not only its own network information, but also network information of other nodes. For example, the nodes of the network are connected to each other in a hierarchical structure as in FIG. 3, and the network information stored in the storage unit 520 of node 2 220 can include not only network information of the node 2 220, but also network information of the node 1 210, the node 6 260, and the node 7 270.

Further, the node 1 210 includes the network information of all nodes existing in the lower layers (the second and third layers as described above), and as the update-request packet is received form the node 1 210, the network information of the node 2 220 can be updated to the network information of all nodes that comprise the network.

The storage unit 520 is a module, such as a compact flash card (CF card), a secure digital card (SD card), a smart media card (SM card), a multimedia card (MMC), or a memory stick, which allows the input and output of information, and can be equipped inside the network-information-providing device 500 or separate therefrom.

The packet-generation unit 540 generates the update-request packet or the response packet including the network information. Further, when the network-information-providing device 500 is disposed in the node 1 210 of FIG. 2, the packet-generation unit 540 can generate the response packet including the address information regarding the object node, and when the network-information-providing device 500 is disposed in the new node 200 of FIG. 2, the packet-generation unit 540 can generate the connection-request packet.

The communication unit 510 communicates with the other nodes of the network and transmits and receives the update-request packet generated by the packet-generation unit 540 or the response packet including the network information. Further, in the case where the network-information-providing device 500 is disposed in the node 1 210 of FIG. 2, the communication unit 510 can transmit and receive the response packet including the address information regarding the object node. And, when the network-information-providing device 500 is disposed in the new node 200 of FIG. 2, the communication unit 510 can transmit the connection-request packet.

The information-update unit 550 updates the stored network information by applying thereto the received network information. The update of the network information by the information-update unit 550 can be performed according to the control command of the control unit 530 as network information is received and can be performed according to a user's selection. The information-update unit 550 may update the network information automatically or manually.

When updating network information, if the difference between the time when the update-request packet is transmitted and the time of receipt of network information received in response to the update-request packet exceeds a predetermined critical time, the information-update unit 550 does not include the network information received from the node in the update. Further, if the node does not receive the network information from a node of the lower layer, the information-update unit 550 can delete the stored network information of the node of the lower layer. As such, the node removes nodes of lower layers from which the node has not received information so as to maintain a current list of nodes.

The control unit 530 extracts the object node whose network connection state is most stable as determined by referring to the stored network information. Here, the stored network information refers to the network information in which the update-request packet is transmitted to the node of the lower layer, and the network information received from the node of the lower layer is applied and updated in response to the transmission. That is, the control unit 530 extracts the object node by referring to the up-to-date or current network information as updated by the information-update unit 550.

When extracting the object node, the control unit 530 determines the priorities by referring to the maximum number of connectable nodes of each node included in the network information, and the node included in the uppermost priority can be determined as the object node, which will be described in detail later with reference to FIG. 7.

FIG. 6 is a table illustrating network information according to aspects of the present invention, and the network-information table 600 includes at least one of the following categories of network information: a node number 615, an address information 620, a memory size 625, a maximum number of connectable nodes 630, a number of currently-connected nodes 635, a first weight 640 based on a difference between the maximum number of connectable nodes and the number of currently-connected nodes, a first time 645 indicating a length of time of the node has been connected to the network, a second weight 650 based on a second time indicating a length of time that the node is expected to maintain the connection to the network, a third weight 655 based on a third time indicating expected to disconnect the connection from the network, or a time 660 when the network information has been updated. However, the network-information table 600 is not limited thereto such that the network-information table 600 may include one, several, all, or more than all of the above-listed categories of network information with respect to the nodes in the network. Further, different nodes connected to the network may provide information different from the other nodes connected to the network in which case the object node is extracted based upon the best network information available. For example, one node may provide information regarding memory size 625 but not regarding the difference between the maximum number of connectable nodes 630 and the number of currently-connected nodes 635; but, another node may provide information regarding the difference between the maximum number of connectable nodes 630 and the number of currently-connected nodes 635 but not regarding the maximum memory size 625. As such, the object node may be determined based upon the best information available.

The address information 620 is used for communication between nodes, and, for example, the IP address and the port number can be included in the address information.

The memory size 625 refers to the capacity of the memory equipped in the node, and the network state is stable because the node has more capacity to perform more work when the memory size 625 of the node is larger. Further, because the network-information-providing device 500 is a type of node, the memory can refer to the storage unit 520 of the network-information-providing unit 500.

The maximum number of connectable nodes 630 refers to the maximum number of other nodes that can connect and communicate to the node at the same time in the case where a certain node communicates with at least one of the other nodes. The number of currently-connected nodes 635 refers to the number of other nodes that are connected to the node at the same time in the case where a certain node communicates with at least one of the other nodes.

The first weight 640 is a value given to the nodes that can be set by referring to the memory size 625 and the difference between the maximum number of connectable nodes 630 for the node and the number of other nodes that are connected to the node 635. For example, if the memory size 625 is large, and the difference between the maximum number of connectable nodes 630 for the node and the number of other nodes that are connected to the node 635 is large, the first weight 640 is set low.

The first time 645 indicates a length of time that a node is connected to the network. For example, the first time for the node 2 of FIG. 6 is 210 seconds.

Further, the second time refers to an arbitrary time expected to keep connection after a certain node is connected to the network, and the third time refers to an arbitrary time expected to disconnect the connection with the network, both of which can be determined considering the average connection time of all of the nodes, and each node has the same value. For example, in the case where the average connection time of the nodes is 300 seconds, meaning that most of the nodes are expected to disconnect in 300 seconds, the third time can be set as 300 seconds. That is, in the case where a node has been connected to the network for about 300 seconds, it is expected that the node will soon disconnect from the network.

Since the third time is set to 300 seconds, the second time can be an arbitrary time between 0 and 300 seconds. For example, the second time can be 100 or 150 seconds. That is, in the case where the connection time after a certain node is connected to the network is 100 or 150 seconds, it is expected that the node will keep the connection. The second time is used for determining priorities, which will be described in detail later with reference to FIG. 7.

The second weight 650 and the third weight 655 refer to the unique values given to the nodes based on the second time and the third time, respectively. For example, in the case where the network connection time, i.e., the second and third times, of the node 1 210 is relatively low, and the network connection time of the node 2 220 is relatively high, the second weight 650 and the third weight 655 given to the node 1 210 have high values, and the second weight 650 and the third weight 655 given to node 2 220 have low values. That is, the second weight 650 and the third weight 655 are set as numerical values to represent the user's patterns and connection times. However, the second weight 650 and the third weight 655 need not be set high or low based on the network connection time of the respective node; the second weight 650 and the third weight 655 need only be valuable in distinguishing one node from another.

The update time of network information 660 refers to the point of time when the stored network information is updated when the update-request packet is received from the node of the uppermost or first layer.

When extracting the object node, if the difference between the update time 660 of network information received on a certain node and the current time is great, the control unit 530 can preferentially exclude the node from the extraction of the object node.

Figure 7:
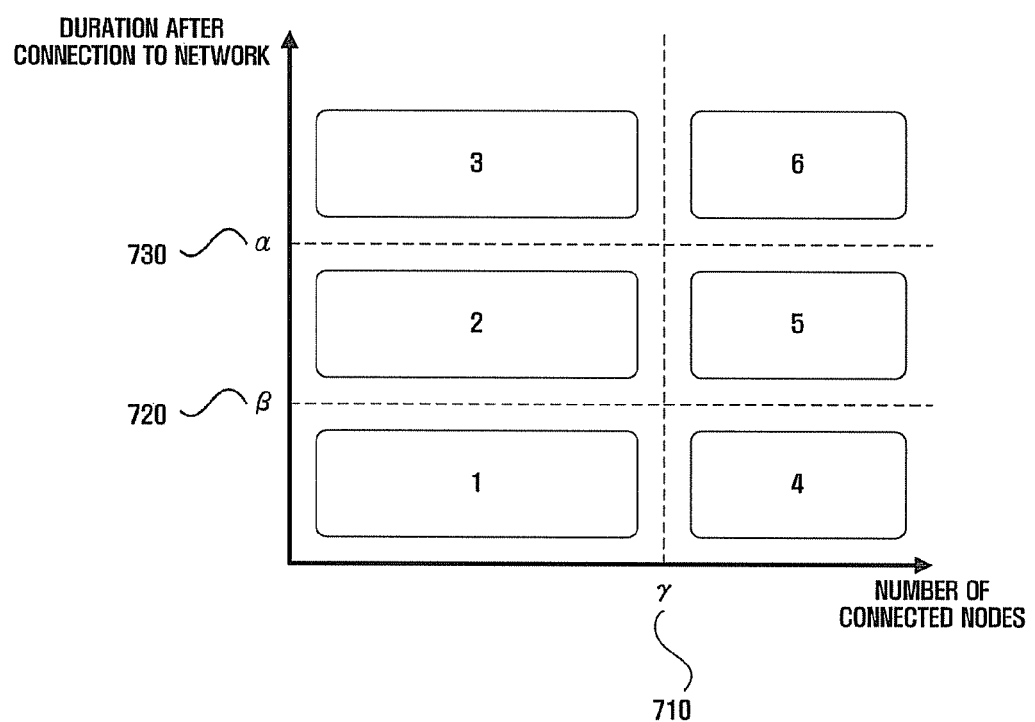
FIG. 7 illustrates the situation where priorities of nodes are determined according to aspects of the present invention.

FIG. 7 illustrates the situation where priorities of nodes are determined according to aspects of the present invention. The horizontal axis refers to the number of nodes, and the vertical axis refers to the duration of connection to the network. Here, the horizontal axis is partitioned into the maximum number of connectable nodes 710, and the vertical axis is partitioned into the second time 720 and the third time 730, in which 6 areas are formed along such partitions, and priorities are given by areas.

Areas of the graph having less than the maximum number of connectable nodes 710 are given higher priorities than areas of the graph having more than the maximum number of connectable nodes 710, and as the duration of connection to the network decreases, higher priorities are given. The number written inside each area refers to its priority.

In FIG. 7, the maximum number of connectable nodes 710, the second time 720, and the third time 730 are fixed values applied to all nodes connected to the network in the same manner. Further, the ability of each node, which can perform the same work as the other nodes connected to the network, varies depending on the memory size and the maximum number of connectable nodes.

Further, the duration of connection to the network varies depending on the user's use pattern with respect to each node, and the second weight based on the second time 702 and the third weight based on the third time 730 are given with respect to each node.

Priorities of each area of FIG. 7 can be expressed by the following Table 1:

TABLE 1

|  | Ordinate | Abscissa |
| --- | --- | --- |
| Priority 1 | $s < I_n \beta$ | $c < \sigma_n \gamma$ |
| Priority 2 | $I_n \beta \leq s < \delta_n \alpha$ | $c < \sigma_n \gamma$ |
| Priority 3 | $s \geq \delta_n \alpha$ | $c < \sigma_n \gamma$ |
| Priority 4 | $s < I_n \beta$ | $c \geq \sigma_n \gamma$ |
| Priority 5 | $I_n \beta \leq s < \delta_n \alpha$ | $c \geq \sigma_n \gamma$ |
| Priority 6 | $s \geq \delta_n \alpha$ | $c \geq \sigma_n \gamma$ |

Here, s is the vertical axis or ordinate, which represents the length of time that the node has been connected to the network, c is the horizontal axis or abscissa, which represents the number of connected nodes. $\alpha$ represents the third time 730, and $\beta$ represents the second time 720. Further, $I_n$ represents the second weight of the $n^{th}$ node, $\delta_n$ represents the third weight of the $n^{th}$ node, $\sigma_n$ represents the first weight, and $\gamma$ represents the maximum number of connectable nodes 710. The Priority 1 represents the highest or uppermost priority. The nodes determined to be in the highest priority, having values as listed above, are the nodes that are expected to provide the most stable connection to the network, and as such, are more likely to be the object node. However, depending upon the load on the network, or the number of nodes attempting to connect or that are connected to the network, there may not be a node in the uppermost or highest priority. In such case, the control unit 530 may extract an object node from a lower priority.

As can be seen from Table 1 and FIG. 7, the highest priority level, from which the object node is preferentially selected, includes nodes having fewer than the maximum number of connectable nodes $\gamma$ (710) connected thereto and that have been connected to the network for a time less than the second time $\beta$ (720). The second highest priority level includes nodes having fewer than the maximum number of connectable nodes $\gamma$ (710) connected thereto and that have been connected to the network for a time between the second time $\beta$ (720) and the third time $\alpha$ (730). The third highest priority includes nodes having fewer than the maximum number of connectable nodes $\gamma$ (710) connected thereto and that have been connected to the network for a time greater than the third time $\alpha$ (730), meaning that the nodes are expected to disconnect from the network soon. Nodes that have fewer nodes than the maximum number of connectable nodes $\gamma$ (710) connected thereto are given priority over nodes that have more than the maximum number of connectable nodes $\gamma$ (710) connected thereto. Further, after priority is determined based on the number of connectable nodes, priority is then given to nodes that have been connected to the network for a time less than the second time $\beta$ (720).

Although FIG. 7 only shows priority being first based on the number of connected nodes being less than the maximum number of connectable nodes $\gamma$ (710), the control unit 530 is not limited thereto. For example, the area in which the number of connected nodes is less than the maximum number of connectable nodes $\gamma$ (710) could be partitioned with finer granularity such that priority could be first based on the extent to which the node has fewer than the maximum number of connectable nodes $\gamma$ (710) connected thereto. Thus, the control unit 530 could assign a higher priority to a particular node that only has one other node connected thereto and has a maximum number of connectable nodes γ (710) equal to 7 than to another particular node that has two other nodes connected thereto and also has a maximum number of connectable nodes γ (710) equal to 7. Further, the partitioning of the time in which the node is connected to the network (s) may also be increased.

The control unit 530 of the network-information-providing device 500 applies priorities to the nodes, and extracts the object node by referring to the received network information. As such, the control unit 530 can extract the object node based on the received network information in which the capability of each node and the user's pattern are reflected.

At least one object node included in the uppermost priority extracted by the control unit 530 can exist. Here, the communication unit 510 can transmit the address information of all object nodes included in the uppermost priority to a new node 200. Further, it is possible that there is no object node included in the uppermost priority. In such case, the control unit 530 extracts the object node from a lower priority group of nodes and provides the address information of the object node included in the highest available priority to the new node 200.

FIG. 8 is a flowchart illustrating the process by which network information is provided to the nodes throughout the network according to aspects of the present invention. In order to provide address information of the object node to a new node 200, the communication unit 510 of the network-information-providing device 500 receives the connection-request packet from the new node 200 (S810). When the connection-request packet is received, the packet-generation unit 540 generates an update-request packet (S820). Here, the update-request packet includes network information stored in the storage unit 520.

The generated update-request packet is transmitted to the other nodes connected through the communication unit 510 (S830). When the update-request packet is transmitted, a timer (not shown) equipped in the network-information-providing device can be started. When the update-request packet is transmitted, a response packet, which includes network information, is received from the nodes to which the update-request packet was sent (S840). The information-update unit 550 updates network information stored in the storage unit 520 from information included in the response packet (S850).

When updating network information, the information-update unit 550 may not reflect network information that has not been received within the critical time in the update. When the network information is updated, the control unit 530 extracts the object node whose network state is most stable by referring to the updated network information (S860). The detailed description on the extraction of the object node is omitted here as it was described in detail with reference to FIG. 7.

The information-update unit 550 may include the network information included in a response packet received in excess of the critical time for the update, and the control unit 530 can extract an object node by simply referring to the update time of the network information. When the object node is extracted, the packet-generation unit 540 generates the packet including the address information of the object node, and the generated packet is transmitted through the communication unit 510 (S870). When receiving the packet including the address information of the object node, the new node 200 attempts to connect to the object node, and because the object node is determined to be in the most stable network state among the nodes included in the network, the new node can easily connect to the network.

Further, in the case where the connection-request packet is received from the new node 200, the control unit 530 checks the update time of the network information stored in the storage unit, and if the update time is close to the current time, the control unit 530 can extract the object node using only with the stored network information.

The method and apparatus according to aspects of the present invention have the following advantages among others. First, in the case where a new node attempts to connect to a network in a distributed network environment, the network states of nodes existing in the network are collected and provided to a new node, by which the network connection of the new node is efficiently performed. Second, by giving the user's usage pattern with respect to each of the nodes existing in the network, and providing such information to the new node, the new node can attempt to connect to the network based on the validity and stability of the node connected.

Although a few embodiments of the present invention have been shown and described, it would be appreciated by those skilled in the art that changes may be made without departing from the principles and spirit of the invention, the scope of which is defined in the following claims and their equivalents.

What is claimed is:

1. A network-information-providing device, comprising:
   a control unit that extracts an object node whose network connection state is most stable by referring to network information of one or more nodes that comprise a network upon receipt of a network-connection request; and
   a communication unit that transmits address information of the object node to a new node attempting to connect to the network,
   wherein the network information comprises at least one of the following categories of network information:
   a memory size of each node;
   a maximum number of nodes connectable to each node;
   a number of nodes currently connected to each node;
   a first weight for each node comprising the difference between the maximum number of connectable nodes and the number of the currently-connected nodes;
   a first time that indicates a length of time that each node has been connected to the network;
   a second weight comprising a second time that indicates a length of time each node is expected to maintain connection to the network;
   a third weight comprising a third time that indicates a length of time each node is expected to disconnect from the network; or
   at least one time that indicates when the network information was last updated,
   wherein the control unit:
   assigns a first priority to a node of the network when the node has fewer nodes currently connected thereto than the maximum number of nodes connectable thereto,
   assigns a second priority to the node of the network when the first time of the node is less than the second time of the node,
   assigns a third priority to the node of the network when the first time of the node is greater than the second time of the node but less than the third time of the node,
   assigns a fourth priority to the node of the network when the first time of the node is greater than the third time of the node, or
   assigns a fifth priority to the node of the network when the node has more nodes currently connected thereto than the maximum number of nodes connectable thereto.

2. The device of claim 1, wherein the control unit determines the first priority of each node based on the first weight given to each node and the maximum number of nodes connectable to each node.

3. The device of claim 2, wherein the control unit determines the second weight and determines the third weight to thereby determine the second priority of each node.

4. The device of claim 3, wherein the control unit extracts the object node based on the first priority if the object node is not extracted by the second priority.

5. The device of claim 1, wherein the communication unit transmits an update-request packet to request the update of the network information.

6. The device of claim 5, wherein the communication unit transmits the update-request packet to the nodes that comprise the network.

7. The device of claim 5, wherein the control unit performs the extraction of the object node without reference to a node if the network information regarding the node is not received within a critical time after the transmission of the update-request packet.

8. The device of claim 1, wherein the network information is collected in response to the update-request packet transmitted from a node of a respective upper layer to a node of a respective lower layer among the nodes that comprise the network.

9. The device of claim 8, wherein the node of the respective upper layer deletes stored network information of the node on the respective lower layer if network information regarding the node on the respective lower layer is not received within a critical time after the transmission of the update-request packet.

10. A network-information-providing method, comprising:
    receiving a network-connection-request packet from a new node requesting to connect to a network;
    transmitting an update-request packet to request updating of network information of one or more nodes that comprise the network upon receipt of the connection-request packet;
    receiving the network information in response to the update-request packet;
    extracting an object node whose network-connection state is most stable by referring to the received network information; and
    transmitting address information of the object node to the new node,
    wherein the network information comprises at least one of the following categories of network information:
    a memory size of each node;
    a maximum number of nodes connectable to each node;
    a number of nodes currently connected to each node;
    a first weight for each node comprising the difference between the maximum number of connectable nodes and the number of the currently-connected nodes;
    a first time to indicate a length of time that each node has been to the network;
    a second weight comprising a second time to indicate a length of time that each node is expected to maintain connection to the network;
    a third weight based on a third time to indicate a length of time in which the node is expected to disconnect from the network; or
    at least one time that indicates when the network information was last updated,
    wherein the method further comprises:
    assigning a first priority to a node of the network when the node has fewer nodes currently connected thereto than the maximum number of nodes connectable thereto,
    assigning a second priority to the node of the network when the first time of the node is less than the second time of the node,
    assigning a third priority to the node of the network when the first time of the node is greater than the second time of the node but less than the third time of the node,
    assigning a fourth priority to the node of the network when the first time of the node is greater than the third time of the node, or
    assigning a fifth priority to the node of the network when the node has more nodes currently connected thereto than the maximum number of nodes connectable thereto.

11. The method of claim 10, wherein the extracting further comprises determining the first priority of each node based on the first weight given to each node and the maximum number of nodes connectable to each node.

12. The method of claim 11, wherein the extracting further comprises determining a second priority of each node based on the second weight and the third weight.

13. The method of claim 12, wherein the extracting further comprises extracting the object node based on the first priority if the object node is not extracted based on the second priority.

14. The method of claim 10, wherein the transmitting further comprises transmitting the update-request packet to the nodes that comprise the network.

15. The method of claim 10, wherein the extracting further comprises determining the object node without reference to a node if the network information regarding the node is not received within a critical time after the transmission of the update-request packet.

16. The method of claim 10, wherein the network information is collected in response to the update-request packet transmitted from a node of a respective upper layer to a node of a respective lower layer among the nodes that comprise the network.

17. The method of claim 16, wherein the node of the respective upper layer deletes stored network information of the node of the respective lower layer if the network information regarding the node of the respective lower layer is not received within a critical time after the transmission of the update-request packet.

18. The device of claim 1, wherein the control unit and the communication unit are disposed in each node comprising the network and the new node.

19. The device of claim 1, wherein the control unit extracts the object node from the nodes connected to the network to which the first priority and the second priority are assigned.

20. The device of claim 19, wherein the control unit extracts the object node from the nodes connected to the network to which the first priority and the third priority are assigned if no nodes in the network are assigned the first and second priorities.

21. The device of claim 19, wherein the control unit extracts the object node from the nodes connected to the network to which the first priority and the fourth priority are assigned if no nodes in the network are assigned the first and second priorities or the first and third priorities.

22. The device of claim 19, wherein the control unit extracts the object node from the nodes connected to the network to which the second priority and the fifth priority are assigned if no nodes in the network are assigned the first priority.

23. The device of claim 1, wherein the first priority further comprises subpriorities in which higher first subpriorities are assigned to the nodes of the network that have a greater difference between the number of nodes currently connected thereto and the maximum number of nodes connectable thereto, and the control unit extracts the object node from the higher first subpriorities.

24. The device of claim 1, wherein each node that comprises the network stores the network information in a storage unit.

25. The device of claim 24, wherein the storage unit comprises a compact flash card, a secure digital card, a smart media card, a multimedia card, and/or a memory stick.

26. The device of claim 1, wherein the network information is previously stored network information.

27. The device of claim 1, wherein the object node is extracted based upon the best network information available.

28. The device of claim 1, wherein if a difference between the at least one time of the network information of a node and a current time is great, the node cannot be extracted as the object node.

29. The device of claim 1, wherein the object node is extracted based on the at least one time.

30. The device of claim 8, wherein the network is arranged in a tree, a line, a mesh, a bus, a star, a ring, or a fully-connected structure.

31. The method of claim 16, wherein the network is arranged in a tree, a line, a mesh, a bus, a star, a ring, or a fully-connected structure.

32. A node connectable to one or more nodes that comprise a network, the node comprising a control unit that extracts an object node whose network connection state is most stable by referring to network information of the one or more nodes that comprise the network upon receipt of a network-connection request; and a communication unit that transmits address information of the object node to a new node attempting to connect to the network, wherein the network information comprises at least one of the following categories of network information:

a memory size of each node;

a maximum number of nodes connectable to each node;

a number of nodes currently connected to each node;

a first weight for each node comprising the difference between the maximum number of connectable nodes and the number of the currently-connected nodes;

a first time that indicates a length of time that each node has been connected to the network;

a second weight comprising a second time that indicates a length of time each node is expected to maintain connection to the network;

a third weight comprising a third time that indicates a length of time each node is expected to disconnect from the network; or at least one time that indicates when the network information was last updated, wherein the control unit:

assigns a first priority to a node of the network when the node has fewer nodes currently connected thereto than the maximum number of nodes connectable thereto, assigns a second priority to the node of the network when the first time of the node is less than the second time of the node, assigns a third priority to the nodes of the network when the first time of the node is greater than the second time of the node but less than the third time of the node, assigns a fourth priority to the nodes of the network when the first time of the node is greater than the third time of the node, or assigns a fifth priority to the node of the network when the node has more nodes currently connected thereto than the maximum number of nodes connectable thereto.

* * * * *